(12) United States Patent
Miyake et al.

(10) Patent No.: US 9,696,465 B2
(45) Date of Patent: Jul. 4, 2017

(54) LIGHT DIFFUSION REFLECTING PLATE

(71) Applicants: Katsuhiro Miyake, Atsugi (JP);
Takuya Echigo, Aikawa-machi (JP);
Toshihiro Kano, Atsugi (JP)

(72) Inventors: Katsuhiro Miyake, Atsugi (JP);
Takuya Echigo, Aikawa-machi (JP);
Toshihiro Kano, Atsugi (JP)

(73) Assignee: DAI NIPPON PRINTING CO., LTD.,
Tokyo (JP)

( * ) Notice: Subject to any disclaimer, the term of this patent is extended or adjusted under 35 U.S.C. 154(b) by 8 days.

(21) Appl. No.: 14/402,391

(22) PCT Filed: May 22, 2013

(86) PCT No.: PCT/JP2013/064221
§ 371 (c)(1),
(2) Date: Nov. 20, 2014

(87) PCT Pub. No.: WO2013/176181
PCT Pub. Date: Nov. 28, 2013

(65) Prior Publication Data
US 2015/0092276 A1    Apr. 2, 2015

(30) Foreign Application Priority Data

May 22, 2012 (JP) ................. 2012-116708

(51) Int. Cl.
*G02B 5/02* (2006.01)
*G02B 13/20* (2006.01)
*G02B 1/11* (2015.01)

(52) U.S. Cl.
CPC ............. *G02B 5/0284* (2013.01); *G02B 1/11* (2013.01); *G02B 5/0242* (2013.01); *G02B 5/0294* (2013.01)

(58) Field of Classification Search
CPC ...... G02B 5/0242; G02B 5/0294; G02B 1/11; G02B 5/0284
(Continued)

(56) References Cited

U.S. PATENT DOCUMENTS 6,738,112 B1    5/2004 Sekiguchi
2005/0157407 A1*    7/2005 Nishida ................ G02B 5/0226
                                                                359/707

FOREIGN PATENT DOCUMENTS

CN    1271426 A    10/2000
JP    9-304604 A    11/1997
(Continued)

OTHER PUBLICATIONS

Search Report of EP Appln. No. 13793412.1-1553 dated Jan. 11, 2016 in English.
(Continued)

*Primary Examiner* — Scott J Sugarman
*Assistant Examiner* — Mustak Choudhury
(74) *Attorney, Agent, or Firm* — Fitch, Even, Tabin & Flannery, LLP (57) ABSTRACT

A light diffusion reflecting plate having a high degree of whiteness and excellent light diffusion properties and anti-glare properties includes a substrate having thereon at least a ground coat layer and a top coat layer in contact with this ground coat layer. The ground coat layer is a white coating film layer. The top coat layer contains a white pigment from 2 to 15% by mass and two kinds of spherical particles, i.e., (A) a spherical particle having an average particle size of from 5 to 30 μm and (B) a spherical particle having an average particle size of from 15 to 45 μm, each of which is contained in an amount of from 5 to 17% by mass. A difference in the average particle size between the spherical particle (A) and the spherical particle (B) is 10 μm or more.

10 Claims, 1 Drawing Sheet

(58) Field of Classification Search
USPC .......... 359/599–605, 229, 488.01, 574, 707
See application file for complete search history.

(56) References Cited

FOREIGN PATENT DOCUMENTS

| | | | |
|---|---|---|---|
| JP | 2002-006399 A | | 1/2002 |
| JP | 2002006399 A | * | 1/2002 |
| JP | 2005-77445 A | | 3/2005 |
| JP | 2005-248189 A | | 9/2005 |
| JP | 2005-251708 A | | 9/2005 |
| JP | 2008-145942 A | | 6/2008 |
| JP | 2009-145842 A | | 7/2009 |
| WO | 2011/027905 A1 | | 3/2011 |

OTHER PUBLICATIONS

Office Action of CN Appln. No. 201380026033.7 dated May 30, 2016.
Office Action of JP Appln. No. 2014-516830 dated Jan. 10, 2017.

* cited by examiner

LIGHT DIFFUSION REFLECTING PLATE

TECHNICAL FIELD

The present invention relates to a light diffusion reflecting plate, and in detail, the present invention relates to a light diffusion reflecting plate having excellent light diffusion reflecting properties and antiglare properties.

BACKGROUND ART

In recent years, in view of an increase in energy-saving consciousness and anxiety about electric power supply, enterprises and public facilities take power saving measures by means of collecting natural light as far as possible, culling out illuminations, or the like. However, there was a concern that comfort or safety is impaired because of a shortage of illuminance due to this power saving. In addition, from the viewpoint of power saving, although LED illuminations which are low in power consumption and long in life are watched, there was involved such a problem that a difference in light and darkness is easily generated even in the same room depending upon a place because of high directivity.

As for these problems, there is made an attempt such that a reflecting plate is disposed in an inner wall, a ceiling, or the like to effectively reflect natural light or illumination light and diffuse the indirect light every nook and corner of the space of the room, thereby increasing the illuminance. In such a reflecting plate, in order to suppress a lowering of the light quantity when the light is reflected on the reflecting plate, a surface of the reflecting plate is required to have high reflecting properties to visible light. Specifically, for example, it is proposed to use a coated steel sheet having a high degree of whiteness. However, in the case of using a coated steel sheet having a high gloss value, although a place irradiated with light causes specular reflection, so that partial brightness is felt, it was difficult to make the surroundings irradiated with light evenly bright.

As for the above-described problem, as conventional light diffusion reflecting materials, for example, those described in PTL 1 are exemplified. PTL 1 proposes a light diffusion reflecting material comprising a covering layer composed of plural layers of two or more layers on a surface of a base material, wherein a non-metallic sheet-like filler is contained in a light diffusion layer of the outermost layer of the plural layers, and rutile type titanium oxide is contained in a visible light reflecting layer which is the thickest among the layers sandwiched between the light diffusion layer and the base material.

CITATION LIST

Patent Literature

[PTL 1]: JP-A 2008-145942

SUMMARY OF INVENTION

Technical Problem

Although it may be considered that the light diffusion reflecting material disclosed in the above-described PTL 1 has a high degree of whiteness and is excellent as a reflecting plate, it was insufficient from the standpoint of diffusion of light and was not satisfactory from the viewpoint of making the illumination in a room bright. In addition, it was also insufficient from the standpoint of antiglare properties, and a more improvement was demanded.

Then, an object of the present invention is to provide a light diffusion reflecting plate having a high degree of whiteness and excellent light diffusion properties and antiglare properties.

Solution to Problem

In order to achieve the above-described object, the present inventors made extensive and intensive investigations, and as a result, it has been found that the above-described problem can be solved by providing a ground coat layer composed of a white coating film layer on a substrate and further providing thereon a top coat layer having two kinds of spherical particles having a different particle size from each other and a white pigment. The present invention has been accomplished on the basis of such findings.

Specifically, the present invention is to provide a light diffusion reflecting plate comprising a substrate having thereon at least a ground coat layer and a top coat layer in contact with this ground coat layer, wherein the ground coat layer is a white coating film layer; the top coat layer contains a white pigment and two kinds of spherical particles; a content of the white pigment in the top coat layer is from 2 to 15% by mass; the two kinds of spherical particles are (A) a spherical particle having an average particle size of from 5 to 30 µM and (B) a spherical particle having an average particle size of from 15 to 45 µm; a difference in the average particle size between the spherical particle (A) and the spherical particle (B) is 10 µm or more; and each of the spherical particle (A) and the spherical particle (B) is contained in an amount of from 5 to 17% by mass in the top coat layer.

Advantageous Effects of Invention

According to the present invention, it is possible to provide a light diffusion reflecting plate having a high degree of whiteness and excellent light diffusion properties and antiglare properties.

DESCRIPTION OF EMBODIMENTS

Figure 1:
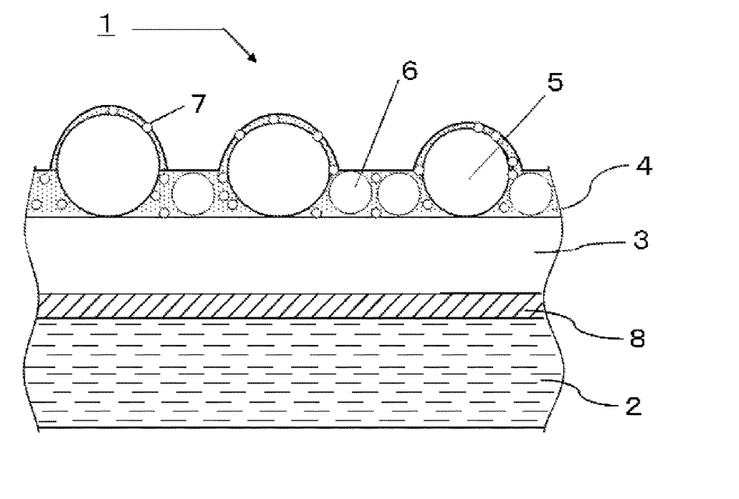
FIG. 1 is a schematic view showing a light diffusion reflecting plate of the present invention.

The light diffusion reflecting plate of the present invention is described in detail while referring to FIG. 1.

A light diffusion reflecting plate 1 of the present invention comprises a substrate 2 having thereon at least a ground coat layer 3 and a top coat layer 4 in contact with this ground coat layer 3, and the top coat layer 4 contains a white pigment 7 and two kinds of spherical particles 5 and 6. In addition, if desired, a primer layer 8 may be provided between the ground coat layer 3 and the substrate 2.

[Substrate]

The substrate which is used for the light diffusion reflecting plate of the present invention is not particularly limited, and examples thereof include a metal sheet, a glass substrate, a ceramic substrate, a woody substrate, a thermosetting resin substrate, a thermoplastic resin substrate, and the like. Of these, from the viewpoint that workability after forming the ground coat layer and the top coat layer on the substrate is favorable, a metal sheet is preferable.

Examples of the metal sheet include plate materials such as a steel sheet, an electroformed iron foil, a stainless steel sheet, an aluminum plate, a duralumin plate, etc., or those plate materials plated with one or two or more kinds of zinc, tin, aluminum, copper, chromium, nickel, iron, or the like; and the like. Examples of plating with two or more kinds include plating with an alloy of iron and zinc, plating with an alloy of aluminum and zinc, and the like. Specific examples of such a metal sheet include steel sheets such as a molten zinc-plated steel sheet, an alloyed molten zinc-plated steel sheet, a zinc-electroplated steel sheet, a zinc alloy-electroplated steel sheet, an aluminum alloy molten zinc-plated steel sheet, a tin plate, a tin-free steel sheet, a laminated damping steel sheet, etc. Although a thickness of such a metal sheet varies with an application, it is, for example, from about 0.3 to 3.0 mm. In addition, as such a metal sheet, materials having been subjected to chemical processing or surface polishing may also be used.

In addition, examples of the glass substrate include soda-lime glass, alkali-free glass, borosilicate glass, high-strain point glass, quartz glass, and the like, and as the ceramic substrate, substrates such as alumina, silica, etc. can be used. Examples of the woody substrate include woody materials such as sliced veneer, wood veneer, plywood, particle board, medium-density fiberboard (MDF), etc. of various materials including cedar, cypress, keyaki, pine tree, lauan, teak, merapi, etc.; and the like. These can be used solely or after being laminated. It is to be noted that the woody substrate is not limited to the woody sheet, but it also includes paper powder-incorporated plastic sheets and papers having reinforced strength. Examples of a thermosetting resin that constitutes the thermosetting resin substrate include a phenol resin, a urea resin, an epoxy resin, an allyl resin, an unsaturated polyester resin, a silicone resin, a polyurethane resin, and the like. In addition, examples of a thermoplastic resin that constitutes the thermoplastic resin substrate include a polyester resin, an acrylic resin, a polyolefin-based resin, a polyvinyl chloride resin, a polystyrene resin, an ABS resin, a polycarbonate resin, a polyamide resin, and the like.

[Ground Coat Layer]

The ground coat layer in the light diffusion reflecting plate of the present invention is a white coating film layer and is a functional layer that contributes to reflection of light. As the white coating film layer, materials obtained by coloring a polyester resin-based paint, a fluorine resin-based paint, a melamine resin-based paint, an acrylic resin-based paint, a urethane resin-based paint, an epoxy resin-based paint, a vinyl chloride resin-based paint, or the like into a white color are used. In addition, of these paints, a polyester resin-based paint and a fluorine resin-based paint are preferable from the standpoint that bendability can be controlled.

In addition, such a paint may contain a curing agent, and for example, a paint obtained by using melamine or isocyanate as a curing agent in a polyester resin-based paint or a fluorine resin-based paint is excellent in workability and suitable.

A molecular weight of the resin which is used for the paint is preferably in the range of from 2,000 to 50,000 in terms of a number average molecular weight. When the number average molecular weight is 2,000 or more, a crack or exfoliation is hardly caused in the coating film at the time of working, whereas when it is not more than 50,000, the paint is easily dissolved in an organic solvent or the like, and operability at the time of coating becomes favorable. From the foregoing standpoint, the number average molecular weight of the resin is more preferably in the range of from 10,000 to 30,000.

The white pigment which is used for the white coating film layer is not particularly limited, and for example, titanium oxide, barium sulfate, zinc white, calcium carbonate, and the like can be used. Of these, titanium oxide having a high reflectance to visible light is preferable.

A content of the white pigment is preferably in the range of from 30 to 60% by mass relative to the whole amount of solids of the white coating film layer. When the content of the white pigment is 30% by mass or more, a sufficient degree of whiteness is obtained, whereas when it is not more than 60% by mass, a sufficient amount of the resin can be ensured as a binder, and therefore, there is no problem such as coating film breakage, etc. From the foregoing viewpoint, the content of the white pigment is more preferably in the range of from 45 to 55% by mass.

A thickness of the ground coat layer is preferably from 15 to 45 µm. When the thickness of the ground coat layer is 15 µm or more, deterioration of the surface appearance to be caused due to coating film breakage is not found, and sufficient degree of whiteness and diffuse reflectance are obtained. From the viewpoints of degree of whiteness and diffuse reflectance, it is suitable that the thickness of the ground coat layer is thick as far as possible; however, when the thickness is too thick, the workability is inferior, so that the thickness is preferably not more than 45 µm. Inconsequence, from the viewpoint of making the degree of whiteness and diffusion reflecting properties more favorable, specifically obtaining a light diffusion reflecting plate having a Y value measured by a color-difference meter as described later (hereinafter referred to simply as "Y value") exceeding 90, it is especially preferable that the thickness of the ground coat layer is more than 30 µm, whereas from the viewpoint that foaming or the like at the time of forming a coating film is not found, the thickness of the ground coat layer is preferably less than 45 µm.

On the other hand, in the case of attaching importance to the workability while having a sufficient degree of whiteness and a certain favorable diffuse reflectance, it is preferable to set the thickness of the ground coat layer to from 15 to 30 µm. More specifically, a light diffusion reflecting plate having a Y value of not more than about 90 and having extremely favorable workability is obtained.

[Top Coat Layer]

The light diffusion reflecting plate of the present invention has a top coat layer in contact with the above-described ground coat layer.

The top coat layer contains a white pigment and two kinds of spherical particles having a different average particle size from each other and is a functional layer that imparts mainly antiglare properties. In general, the top coat layer is constituted of a resin composition in which the above-described white pigment and spherical particles are added to a resin binder.

As the resin binder, the same resin as that used for the white coating film layer that constitutes the ground coat layer can be used, and similar to the ground coat layer, from the viewpoint that bendability can be controlled, a polyester resin and a fluorine resin are suitably used.

With respect to the white pigment which is used for the top coat layer, the same white pigment as that used for the white coating film layer that constitutes the ground coat layer can also be used. Similar to the ground coat layer, titanium oxide is preferable from the standpoint that it has a high reflectance to visible light.

A content of the white pigment in the top coat layer is in the range of from 2 to 15% by mass relative to the whole amount of solids of the top coat layer. When the content of the white pigment is 2% by mass or more, the degree of whiteness and light diffusion reflecting properties become favorable, whereas when it is not more than 15% by mass, the antiglare properties become favorable.

It is essential that the two kinds of spherical particles having a different average particle size from each other, which are contained in the top coat layer, are (A) a spherical particle having an average particle size of from 5 to 30 µm and (B) a spherical particle having an average particle size of from 15 to 45 µm; and that a difference in the average particle size between the spherical particle (A) and the spherical particle (B) is 10 µm or more. By using such two kinds of spherical particles having a different average particle size from each other, it is possible to effectively impart antiglare properties to the light diffusion reflecting plate of the present invention. In FIG. 1, the spherical particle (A) is shown as the spherical particle 6 which is relatively small, and the spherical particle (B) is shown as the spherical particle 5 which is relatively large. It is to be noted that in the present invention, the top coat layer may contain two kinds of different particles such that a difference in the average particle size between the above-described spherical particle (A) and spherical particle (B) is 10 µm or more, and it may further contain other particles within the range where the effects of the present invention are not impaired.

It is to be noted that in the present invention, a volume accumulation particle size $D_{50}$ (particle size at a volume accumulation of 50%) by the laser diffraction scattering type particle size distribution measurement method was adopted as the average particle size of the spherical particle.

A content of each of the two kinds of spherical particles is in the range of from 5 to 17% by mass relative to the whole amount of solids of the top coat layer. When the content of each of the two kinds of spherical particles is 5% by mass or more, sufficient antiglare properties are obtained, whereas it is not more than 17% by mass, the workability is favorable. From the foregoing viewpoint, the content of each of the two kinds of spherical particles is more preferably in the range of from 6 to 16% by mass.

The above-described two kinds of spherical particles are not particularly limited so long as they have the above-described particle sizes, respectively, and a resin bead, a glass bead, an inorganic particle, and the like can be used. Of these, a resin bead is preferable for reasons such as a standpoint that the transparency is high, a standpoint that a specific gravity thereof is light and close to a specific gravity of the resin composition for forming the top coat layer, etc.

With respect to the transparency, when the transparency of the spherical particle is higher, the effects of the white pigment contained in the white coating film layer that constitutes the ground coat layer or the top coat layer appear more remarkably, and therefore, the resin bead is preferable from the standpoint of giving a favorable degree of whiteness to the light diffusion reflecting plate of the present invention. Furthermore, in view of the fact that the specific gravity is light, the resin bead is easy to float on and appear above the surface of the top coat layer, whereby more favorable diffusion reflecting properties and antiglare properties are obtained.

As the above-described resin bead, various resin beads are exemplified, and for example, a urethane-based resin bead, an acrylic resin bead, and a urea-based resin bead, and besides, a benzoguanamine/formaldehyde condensate bead, a benzoguanamine/melamine/formaldehyde condensate bead, a nylon bead, and a mixed bead thereof can be used. Since such a resin bead is high in heat resistance, it is advantageous in the case of being subjected to baking curing processing in a forming process of the top coat layer. In addition, in the case of not adopting the baking curing processing in a production step, a thermoplastic resin bead such as a polyamide-based bead, a polyolefin-based bead, a polycarbonate-based bead, a polystyrene-based bead, etc. can also be used.

In addition, examples of the inorganic particle include silica, talc, calcium carbonate, barium sulfate, calcium silicate, and the like, and a hollow bead containing an air layer in the inside thereof and a commercially available product can also be used.

In order to impart design properties, other pigments or the like can be added to the top coat layer. For example, as a material that increases the design properties without impairing the effects of the present invention, a pearl pigment or the like is suitably exemplified. Examples of the pearl pigment include mica base pearl pigments in which a surface of natural mica or artificial mica is covered by a metal oxide and/or a metal oxide hydrate of a metal such as titanium, zirconium, silicon, aluminum, cerium, etc., and for example, titanium dioxide-covered mica is suitably used.

Although the particle size and content of the pearl pigment are not particularly limited within the range where the effects of the present invention are not impaired, the particle size is preferably in the range of from 5 to 60 µm, and the content is not more than 15% by mass, and suitably not more than 11% by mass relative to the whole amount of solids of the top coat layer.

In addition, a thickness of the top coat layer is preferably from 15 to 30 µm. When the thickness of the top coat layer is 15 µm or more, deterioration of the surface appearance to be caused due to coating film breakage is not found, whereas when it is not more than 30 µm, not only favorable workability is obtained, but foaming or the like at the time of forming a coating film is not found. It is to be noted that the thickness of the top coat layer as referred to in the present invention means a thickness of the resin portion in the layer but does not include the portion of the spherical particle that appears above the resin.

[Primer Layer]

The light diffusion reflecting plate of the present invention may further have a primer layer between the substrate and the ground coat layer. Adhesion between the substrate and the ground coat layer or other layer can be improved by the primer layer.

It is preferable that the primer layer is constituted of a resin material, and specifically, examples thereof include an acrylic resin, a polyester-based resin, a urethane-based resin, an epoxy-based resin, a fluorine-based resin, and the like. If desired, various additives can be added to the primer layer, and for example, in the case of using a metal sheet as the substrate, it is preferable to contain an antirust agent.

Although a thickness of the primer layer is not particularly limited so long as adhesion between the substrate and other layer can be improved, it is usually from about 0.5 to 5 µm.

In the above-described respective layers, various additives can be contained according to physical properties which are required depending upon the purpose or application and within the range where the effects of the present invention are not impaired. Examples of the additive include an abrasion resistance improver, a weather resistance improver, a polymerization inhibitor, an infrared absorber, an antistatic agent, an adhesiveness improver, a leveling agent, a plasticizer, a defoaming agent, a coloring agent, an antibacterial agent, and the like. It is to be noted that the contents of such various additives are properly set up within the range where the effects of the present invention are not impaired while thoroughly obtaining the effects of the various additives.

[Production Method of Light Diffusion Reflecting Plate]

In the light diffusion reflecting plate of the present invention, a ground coat layer is first formed on a substrate. As for a forming method of the ground coat layer, a resin composition for forming a ground coat layer is prepared and then subjected to a known coating method such as a bar coating method, a roll coating method, a flow coating method, a spray coating method, etc., or a known printing method such as a gravure printing method, a gravure offset printing method, a silk screen printing method, etc.

In the case where the substrate is a steel sheet or a heat-resistant resin sheet, the ground coat layer is cured by heat processing at a circumferential temperature of from 180 to 280° C., and preferably from 200 to 250° C. for from about 20 to 300 seconds by means of a known heating system such as hot air heating, far infrared heating, etc. (baking curing processing).

In the present invention, in order to form a white coating film layer as the ground coat layer, it is preferable to use, as the resin composition for forming a ground coat layer, a mixture of a resin-based paint with a white pigment as described above. As described above, though a content of the white pigment is preferably in the range of from 30 to 60% by mass relative to the whole amount of solids of the white coating film layer, it is preferable to add a solvent thereto, thereby regulating a viscosity at which the coating film layer is easily formed. The solvent which is used herein is not particularly limited, and examples thereof include aliphatic hydrocarbons such as hexane, heptane, cyclohexane, etc.; aromatic hydrocarbons such as toluene, xylene, etc.; halogenated hydrocarbons such as methylene chloride, ethylene chloride, etc.; alcohols such as methanol, ethanol, propanol, butanol, 1-methoxy-2-propanol, etc.; ketones such as acetone, methyl ethyl ketone, 2-pentanone, methyl isobutyl ketone, cyclohexanone, isophorone, etc.; esters such as ethyl acetate, butyl acetate, etc.; cellosolve-based solvents such as ethyl cellosolve, etc.; and the like. These solvents may be used solely, or may be used in admixture of two or more kinds thereof.

It is to be noted that in order to increase adhesion between the substrate and the ground coat layer, a primer layer may be provided, if desired before forming the ground coat layer.

Subsequently, a top coat layer is formed on the ground coat layer. Similar to the ground coat layer, in the formation of a top coat layer, a resin composition for forming a top coat layer is prepared and then subjected to coating or printing in the same method as that in the ground coat layer. As described above, the resin composition for forming a top coat layer has a binder resin, a white pigment, and two kinds of spherical particles having a different average particle size from each other in desired contents, respectively and is diluted with a solvent, and the solution is then coated or printed on the ground coat layer. The solvent is the same as that used for the ground coat layer.

A baking condition is also the same as the baking condition for the ground coat layer.

It is to be noted that after subjecting the ground coat layer to baking curing processing, the resin composition for forming a top coat layer may be coated or printed, followed by subjecting the top coat layer to baking curing processing; or the ground coat layer and the top coat layer can also be subjected to baking curing processing by coating or printing the resin composition for forming a ground coat layer, subsequently coating or printing the resin composition for forming a top coat layer, and thereafter, carrying out baking curing processing together.

EXAMPLES

Next, the present invention is described in more detail by reference to the Examples, but it should be construed that the present invention is not limited to these Examples at all.

It is to be noted that the light diffusion reflecting plate fabricated in each of the Examples and Comparative Examples was subjected to performance evaluation in the following methods.

(Performance Evaluation)

(1) (Surface Appearance)

As for the light diffusion reflecting plate obtained in each of the Examples and Comparative Examples, the surface was observed through visual inspection and evaluated. The evaluation criteria are as follows.

A: Neither coating film breakage nor foaming of coating film was generated.

B: Slight coating film breakage or slight foaming of coating film was generated.

C: Coating film breakage or foaming of coating film was generated.

(2) Workability

The light diffusion reflecting plate obtained in each of the Examples and Comparative Examples was subjected to 90-degree bending working using a hand press (manufactured by Morimitsu Co., Ltd.), and the state of cracks in a worked 50 mm-wide plate was observed with a magnifying lens and evaluated. The evaluation criteria are as follows.

A: No crack was observed.

B: Cracks were slightly observed.

C: Cracks of a middle degree between the evaluation B and the evaluation D were observed.

D: A lot of cracks were observed.

(3) Degree of Whiteness (Y Value)

The Y value was determined in conformity with JIS K5400 (General Testing Methods for Paints) 7.5 (Luminous Reflectance) and evaluated according to the following criteria. "SM-6-IS-2B", manufactured by Suga Test Instruments Co., Ltd. was used as a color-difference meter.

A: The Y value was 90 or more.

B: The Y value was 87 or more and less than 90.

C: The Y value was less than 87.

(4) Antiglare Properties

A gloss value at each of 60 degrees and 20 degrees was measured by using a gloss meter ("VG2000", manufactured by Nippon Denshoku Industries Co., Ltd.) and evaluated according to the following criteria. The numerals in the parentheses in the tables show gloss values, respectively.

60-Degree specular gloss value

A: From 0 to 7.4 (No glare was observed.)

B: From 7.5 to 12.9 (Glare was slightly observed.)

C: 13.0 or more (Glare was observed.)

20-Degree specular gloss value

A: From 0 to 2.2 (No glare was observed.)

B: From 2.3 to 3.0 (Glare was slightly observed.)

C: 3.1 or more (Glare was observed.)

Example 1

A polyester-based white paint ("EMP108", manufactured by DIC Graphics Corporation (solid content: 50% by mass) was diluted with a mixed solvent of xylene and cyclohexanone (mass ratio: 1/1), thereby preparing a resin composition for forming a ground coat layer having a viscosity of 0.20 Pa/s.

Subsequently, the resin composition for forming a ground coat layer was coated on a substrate made of a 0.6 mm-thick zinc-electroplated steel sheet by the bar coating method such that a thickness after baking was 25 μm and then baked under a condition at a highest attained temperature of the substrate of 210° C., thereby forming a ground coat layer in a cured state.

Subsequently, 11% by mass of a urethane-based resin bead having an average particle size of 20 μm (spherical particle (A)) and 5.5% by mass of a urethane-based resin bead having an average particle size of 40 μm (spherical particle (B)) as spherical particles and further 11% by mass of titanium oxide (manufactured by Ishihara Sangyo Kaisha, Ltd.) as a white pigment were contained in a polyester-based clear paint ("FLEXICOAT 5100", manufactured by Nippon Fine Coatings, Inc. (solid content:43% by mass), and the resultant was then diluted with a mixed solvent composed of cyclohexanone, butyl acetate, and alkylbenzene (mass ratio: 3/16/1), thereby preparing a resin composition for forming a top coat layer having a viscosity of 0.08 Pa/s.

The resin composition for forming a top coat layer was coated on the ground coat layer by the bar coating method such that a thickness after baking was 20 μm and then baked under a condition at a highest attained temperature of the substrate of 216° C., thereby forming a top coat layer in a completely cured state.

The thus produced light diffusion reflecting plate was evaluated by the above-described methods. The constitution of each of the layers of the light diffusion reflecting plate is shown in Table 1, and the evaluation results are shown in Table 2.

Examples 2 to 8

Light diffusion reflecting plates were produced in the same manner as that in Example 1, except that in Example 1, the resin composition for forming a ground coat layer was coated by the bar coating method such that the thickness after baking was changed to a thickness described in Table 1 and Table 2, respectively and then evaluated in the same manner as that in Example 1. The constitution of each of the layers of the light diffusion reflecting plate is shown in Table 1, and the evaluation results are shown in Table 2.

Example 9

A light diffusion reflecting plate was produced in the same manner as that in Example 1, except that in Example 1, 11% by mass of an acrylic resin bead having an average particle size of 10 μm (spherical particle (A)) and 5.5% by mass of an acrylic resin bead having an average particle size of 30 μm (spherical particle (B)) were used as the spherical particle; and that the thickness of the ground coat layer was changed to 30 μm and then evaluated in the same manner as that in Example 1. The constitution of each of the layers of the light diffusion reflecting plate is shown in Table 1, and the evaluation results are shown in Table 2.

Examples 10 to 12

Light diffusion reflecting plates were produced in the same manner as that in Example 9, except that in Example 9, the resin composition for forming a ground coat layer was coated by the bar coating method such that a thickness after baking was changed to a thickness described in Table 1 and Table 2, respectively and evaluated in the same manner that in Example 1. The constitution of each of the layers of the light diffusion reflecting plate is shown in Table 1, and the evaluation results are shown in Table 2.

Examples 13 to 16

Light diffusion reflecting plates were produced in the same manner as that in Example 1, except that in Example 1, the resin composition for forming a top coat layer was coated by the bar coating method such that the thickness after baking was changed to a thickness described in Table 1 and Table 3, respectively and then evaluated in the same manner as that in Example 1. The constitution of each of the layers of the light diffusion reflecting plates is shown in Table 1, and the evaluation results are shown in Table 3.

Example 17

A light diffusion reflecting plate was produced in the same manner as that in Example 1, except that in Example 1, 11% by mass of an acrylic resin bead having an average particle size of 10 μm (spherical particle (A) as described above) and 5.5% by mass of an acrylic resin bead having an average particle size of 30 μm (spherical particle (B) as described above) were used as the spherical particle and then evaluated in the same manner as that in Example 1. The constitution of each of the layers of the light diffusion reflecting plates is shown in Table 1, and the evaluation results are shown in Table 3.

Examples 18 to 20

Light diffusion reflecting plates were produced in the same manner as that in Example 17, except that in Example 17, the resin composition for forming a top coat layer was coated by the bar coating method such that the thickness after baking was changed to a thickness described in Table 1 and Table 3, respectively and then evaluated in the same manner as that in Example 1. The constitution of each of the layers of the light diffusion reflecting plates is shown in Table 1, and the evaluation results are shown in Table 3.

Examples 21 and 22

Light diffusion reflecting plates were produced in the same manner as that in Example 17, except that in Example 17, a resin bead having the kind and particle size described in Table 1 (spherical particle (B)) was used in place of the acrylic resin bead having an average particle size of 30 μm (spherical particle (B) as described above) and then evaluated in the same manner as that in Example 1. The constitution of each of the layers of the light diffusion reflecting plates is shown in Table 1, and the evaluation results are shown in Table 4.

Comparative Example 1

A light diffusion reflecting plate was produced in the same manner as that in Example 17, except that in Example 17, an acrylic resin bead having an average particle size of 5 μm (spherical particle (B)) was used in place of the acrylic resin bead having an average particle size of 30 μm (spherical particle (B)) and then evaluated in the same manner as that in Example 1. The constitution of each of the layers of the light diffusion reflecting plates is shown in Table 1, and the evaluation results are shown in Table 4.

Comparative Example 2

A light diffusion reflecting plate was produced in the same manner as that in Example 17, except that in Example 17, a urethane-based resin bead having an average particle size of 50 μm (spherical particle (B)) was used in place of the acrylic resin bead having an average particle size of 30 μm (spherical particle (B)) and then evaluated in the same manner as that in Example 1. The constitution of each of the layers of the light diffusion reflecting plates is shown in Table 1, and the evaluation results are shown in Table 4.

Example 23

A light diffusion reflecting plate was produced in the same manner as that in Example 1, except that in Example 1, an acrylic resin bead having an average particle size of 10 μm (spherical particle (A) as described above) was used in place of the urethane-based resin bead having an average particle size of 20 μm (spherical particle (A) as described above) and then evaluated in the same manner as that in Example 1. The constitution of each of the layers of the light diffusion reflecting plate is shown in Table 1, and the evaluation results are shown in Table 5.

Examples 24 and 25

Light diffusion reflecting plates were produced in the same manner as that in Example 23, except that in Example 23, the content of the acrylic resin bead having an average particle size of 10 μm (spherical particle (A) as described above) was changed to a content described in Table 1 and Table 5, respectively and then evaluated in the same manner as that in Example 1. The constitution of each of the layers of the light diffusion reflecting plate is shown in Table 1, and the evaluation results are shown in Table 5.

Comparative Examples 3 and 4

Light diffusion reflecting plates were produced in the same manner as that in Example 23, except that in Example 23, the content of the acrylic resin bead having an average particle size of 10 μm (spherical particle (A) as described above) was changed to a content described in Table 1 and Table 5, respectively and then evaluated in the same manner as that in Example 1. The constitution of each of the layers of the light diffusion reflecting plate is shown in Table 1, and the evaluation results are shown in Table 5.

Examples 26 and 27 and Comparative Examples 5 and 6

Light diffusion reflecting plates were produced in the same manner as that in Example 23, except that in Example 23, the content of the urethane-based resin bead having an average particle size of 40 μm (spherical particle (B) as described above) was changed to a content described in Table 1 and Table 5, respectively and then evaluated in the same manner as that in Example 1. The constitution of each of the layers of the light diffusion reflecting plate is shown in Table 1, and the evaluation results are shown in Table 5.

Examples 28 to 32 and Comparative Examples 7 to 9

Light diffusion reflecting plates were produced in the same manner as that in Example 1, except that in Example 1, the content of the white pigment to be contained in the top coat layer was changed to a content described in Table 1 and Table 6, respectively and then evaluated in the same manner as that in Example 1. The constitution of each of the layers of the light diffusion reflecting plates is shown in Table 1, and the evaluation results are shown in Table 6. It is to be noted that Comparative Example 7 means that the white pigment was not contained.

Examples 33 to 37 and Comparative Examples 10 to 12

Light diffusion reflecting plates were produced in the same manner as that in Example 17, except that in Example 17, the content of the white pigment to be contained in the top coat layer was changed to a content described in Table 1 and Table 6, respectively and then evaluated in the same manner as that in Example 1. The constitution of each of the layers of the light diffusion reflecting plates is shown in Table 1, and the evaluation results are shown in Table 6. It is to be noted that Comparative Example 10 means that the white pigment was not contained.

TABLE 1-1

| | | Top coat layer | | | | | | | | |
|---|---|---|---|---|---|---|---|---|---|---|
| | | | Resin bead (spherical particle (A)) | | | Resin bead (spherical particle (B)) | | | Difference | White |
| | Ground coat layer Thickness (μm) | Thickness (μm) | Kind | Average particle size (μm) | Content (% by mass) | Kind | Average particle size (μm) | Content (% by mass) | in average particle size (μm) | pigment Content (% by mass) |
| Example 1 | 25 | 20 | Urethane-based resin | 20 | 11 | Urethane-based resin | 40 | 5.5 | 20 | 11 |
| Example 2 | 10 | 20 | Urethane-based resin | 20 | 11 | Urethane-based resin | 40 | 5.5 | 20 | 11 |
| Example 3 | 15 | 20 | Urethane-based resin | 20 | 11 | Urethane-based resin | 40 | 5.5 | 20 | 11 |
| Example 4 | 20 | 20 | Urethane-based resin | 20 | 11 | Urethane-based resin | 40 | 5.5 | 20 | 11 |
| Example 5 | 30 | 20 | Urethane-based resin | 20 | 11 | Urethane-based resin | 40 | 5.5 | 20 | 11 |
| Example 6 | 35 | 20 | Urethane-based resin | 20 | 11 | Urethane-based resin | 40 | 5.5 | 20 | 11 |
| Example 7 | 40 | 20 | Urethane-based resin | 20 | 11 | Urethane-based resin | 40 | 5.5 | 20 | 11 |
| Example 8 | 45 | 20 | Urethane-based resin | 20 | 11 | Urethane-based resin | 40 | 5.5 | 20 | 11 |
| Example 9 | 30 | 20 | Acrylic resin | 10 | 11 | Acrylic resin | 30 | 5.5 | 20 | 11 |
| Example 10 | 35 | 20 | Acrylic resin | 10 | 11 | Acrylic resin | 30 | 5.5 | 20 | 11 |
| Example 11 | 40 | 20 | Acrylic resin | 10 | 11 | Acrylic resin | 30 | 5.5 | 20 | 11 |

TABLE 1-1-continued

|  | Ground coat layer Thickness (μm) | Top coat layer Thickness (μm) | Resin bead (spherical particle (A)) Kind | Average particle size (μm) | Content (% by mass) | Resin bead (spherical particle (B)) Kind | Average particle size (μm) | Content (% by mass) | Difference in average particle size (μm) | White pigment Content (% by mass) |
|---|---|---|---|---|---|---|---|---|---|---|
| Example 12 | 45 | 20 | Acrylic resin | 10 | 11 | Acrylic resin | 30 | 5.5 | 20 | 11 |
| Example 13 | 25 | 10 | Urethane-based resin | 20 | 11 | Urethane-based resin | 40 | 5.5 | 20 | 11 |
| Example 14 | 25 | 15 | Urethane-based resin | 20 | 11 | Urethane-based resin | 40 | 5.5 | 20 | 11 |
| Example 15 | 25 | 25 | Urethane-based resin | 20 | 11 | Urethane-based resin | 40 | 5.5 | 20 | 11 |
| Example 16 | 25 | 30 | Urethane-based resin | 20 | 11 | Urethane-based resin | 40 | 5.5 | 20 | 11 |
| Example 17 | 25 | 20 | Acrylic resin | 10 | 11 | Acrylic resin | 30 | 5.5 | 20 | 11 |
| Example 18 | 25 | 15 | Acrylic resin | 10 | 11 | Acrylic resin | 30 | 5.5 | 20 | 11 |
| Example 19 | 25 | 25 | Acrylic resin | 10 | 11 | Acrylic resin | 30 | 5.5 | 20 | 11 |
| Example 20 | 25 | 30 | Acrylic resin | 10 | 11 | Acrylic resin | 30 | 5.5 | 20 | 11 |
| Example 21 | 25 | 20 | Acrylic resin | 10 | 11 | Urethane-based resin | 20 | 5.5 | 10 | 11 |
| Example 22 | 25 | 20 | Acrylic resin | 10 | 11 | Urethane-based resin | 40 | 5.5 | 30 | 11 |
| Example 23 | 25 | 20 | Acrylic resin | 10 | 11 | Urethane-based resin | 40 | 5.5 | 30 | 11 |
| Example 24 | 25 | 20 | Acrylic resin | 10 | 5.5 | Urethane-based resin | 40 | 5.5 | 30 | 11 |
| Example 25 | 25 | 20 | Acrylic resin | 10 | 16.5 | Urethane-based resin | 40 | 5.5 | 30 | 11 |
| Example 26 | 25 | 20 | Acrylic resin | 10 | 11 | Urethane-based resin | 40 | 11 | 30 | 11 |
| Example 27 | 25 | 20 | Acrylic resin | 10 | 11 | Urethane-based resin | 40 | 16.5 | 30 | 11 |

TABLE 1-2

|  | Ground coat layer Thickness (μm) | Top coat layer Thickness (μm) | Resin bead (spherical particle (A)) Kind | Average particle size (μm) | Content (% by mass) | Resin bead (spherical particle (B)) Kind | Average particle size (μm) | Content (% by mass) | Difference in average particle size (μm) | White pigment Content (% by mass) |
|---|---|---|---|---|---|---|---|---|---|---|
| Example 28 | 25 | 20 | Urethane-based resin | 20 | 11 | Urethane-based resin | 40 | 5.5 | 20 | 2.2 |
| Example 29 | 25 | 20 | Urethane-based resin | 20 | 11 | Urethane-based resin | 40 | 5.5 | 20 | 4.4 |
| Example 30 | 25 | 20 | Urethane-based resin | 20 | 11 | Urethane-based resin | 40 | 5.5 | 20 | 6.6 |
| Example 31 | 25 | 20 | Urethane-based resin | 20 | 11 | Urethane-based resin | 40 | 5.5 | 20 | 8.8 |
| Example 32 | 25 | 20 | Urethane-based resin | 20 | 11 | Urethane-based resin | 40 | 5.5 | 20 | 13.2 |
| Example 33 | 25 | 20 | Acrylic resin | 10 | 11 | Acrylic resin | 30 | 5.5 | 20 | 2.2 |
| Example 34 | 25 | 20 | Acrylic resin | 10 | 11 | Acrylic resin | 30 | 5.5 | 20 | 4.4 |
| Example 35 | 25 | 20 | Acrylic resin | 10 | 11 | Acrylic resin | 30 | 5.5 | 20 | 6.6 |
| Example 36 | 25 | 20 | Acrylic resin | 10 | 11 | Acrylic resin | 30 | 5.5 | 20 | 8.8 |
| Example 37 | 25 | 20 | Acrylic resin | 10 | 11 | Acrylic resin | 30 | 5.5 | 20 | 13.2 |
| Comparative Example 1 | 25 | 20 | Acrylic resin | 10 | 11 | Acrylic resin | 5 | 5.5 | 5 | 11 |
| Comparative Example 2 | 25 | 20 | Acrylic resin | 10 | 11 | Urethane-based resin | 50 | 5.5 | 40 | 11 |
| Comparative Example 3 | 25 | 20 | Acrylic resin | 10 | 2.2 | Urethane-based resin | 40 | 5.5 | 30 | 11 |
| Comparative Example 4 | 25 | 20 | Acrylic resin | 10 | 22 | Urethane-based resin | 40 | 5.5 | 30 | 11 |
| Comparative Example 5 | 25 | 20 | Acrylic resin | 10 | 11 | Urethane-based resin | 40 | 2.2 | 30 | 11 |
| Comparative Example 6 | 25 | 20 | Acrylic resin | 10 | 11 | Urethane-based resin | 40 | 22 | 30 | 11 |
| Comparative Example 7 | 25 | 20 | Urethane-based resin | 20 | 11 | Urethane-based resin | 40 | 5.5 | 20 | 0 |
| Comparative Example 8 | 25 | 20 | Urethane-based resin | 20 | 11 | Urethane-based resin | 40 | 5.5 | 20 | 15.4 |
| Comparative Example 9 | 25 | 20 | Urethane-based resin | 20 | 11 | Urethane-based resin | 40 | 5.5 | 20 | 17.6 |
| Comparative Example 10 | 25 | 20 | Acrylic resin | 10 | 11 | Acrylic resin | 30 | 5.5 | 20 | 0 |
| Comparative Example 11 | 25 | 20 | Acrylic resin | 10 | 11 | Acrylic resin | 30 | 5.5 | 20 | 15.4 |
| Comparative Example 12 | 25 | 20 | Acrylic resin | 10 | 11 | Acrylic resin | 30 | 5.5 | 20 | 17.6 |

TABLE 2-1

|  | Thickness of ground coat layer (μm) | Evaluation results ||||
|---|---|---|---|---|---|---|
|  |  | Surface appearance | Workability | Degree of whiteness (Y value) | 60-Degree gloss value | 20-Degree gloss value |
| Example 1 | 25 | A | A | B (89.6) | A (5.5) | A (2.0) |
| Example 2 | 10 | B | A | C (80.4) | A (5.9) | A (2.0) |
| Example 3 | 15 | A | A | B (87.0) | A (5.8) | A (2.0) |
| Example 4 | 20 | A | A | B (88.1) | A (5.5) | A (2.0) |
| Example 5 | 30 | A | A | B (89.7) | A (5.4) | A (2.0) |
| Example 6 | 35 | A | B | A (93.1) | A (5.3) | A (2.0) |
| Example 7 | 40 | A | B | A (94.0) | A (5.3) | A (2.0) |
| Example 8 | 45 | A | B | A (94.1) | A (5.3) | A (2.0) |

TABLE 2-2

|  | Thickness of ground coat layer (μm) | Evaluation results ||||
|---|---|---|---|---|---|---|
|  |  | Surface appearance | Workability | Degree of whiteness (Y value) | 60-Degree gloss value | 20-Degree gloss value |
| Example 9 | 30 | A | A | B (89.5) | A (6.5) | A (2.1) |
| Example 10 | 35 | A | B | A (92.9) | A (6.5) | A (2.1) |
| Example 11 | 40 | A | B | A (93.7) | A (6.5) | A (2.1) |
| Example 12 | 45 | A | B | A (94.0) | A (6.5) | A (2.1) |

TABLE 3-1

|  | Thickness of top coat layer (μm) | Evaluation results ||||
|---|---|---|---|---|---|---|
|  |  | Surface appearance | Workability | Degree of whiteness (Y value) | 60-Degree gloss value | 20-Degree gloss value |
| Example 1 | 20 | A | A | B (89.6) | A (5.5) | A (2.0) |
| Example 13 | 10 | B | A | B (89.9) | A (5.4) | A (2.0) |
| Example 14 | 15 | A | A | B (89.7) | A (5.5) | A (2.0) |
| Example 15 | 25 | A | A | B (88.8) | A (5.7) | A (2.0) |
| Example 16 | 30 | A | A | B (88.1) | A (5.8) | A (2.0) |

TABLE 3-2

|  | Thickness of top coat layer (μm) | Evaluation results ||||
|---|---|---|---|---|---|---|
|  |  | Surface appearance | Workability | Degree of whiteness (Y value) | 60-Degree gloss value | 20-Degree gloss value |
| Example 17 | 20 | A | A | B (89.5) | A (6.5) | A (2.1) |
| Example 18 | 15 | A | A | B (89.2) | A (6.3) | A (2.1) |
| Example 19 | 25 | A | A | B (89.1) | A (6.9) | A (2.1) |
| Example 20 | 30 | A | A | B (88.7) | A (7.3) | A (2.2) |

TABLE 4

|  | Average particle size of spherical particle (B) (μm) | Evaluation results ||||
|---|---|---|---|---|---|---|
|  |  | Surface appearance | Workability | Degree of whiteness (Y value) | 60-Degree gloss value | 20-Degree gloss value |
| Example 17 | 30 | A | A | B (89.5) | A (6.5) | A (2.1) |
| Example 21 | 20 | A | A | B (88.9) | A (6.9) | A (2.1) |

TABLE 4-continued

|  | Average particle size of spherical particle (B) (μm) | Evaluation results | | | | |
| --- | --- | --- | --- | --- | --- | --- |
|  |  | Surface appearance | Workability | Degree of whiteness (Y value) | 60-Degree gloss value | 20-Degree gloss value |
| Example 22 | 40 | A | A | B (89.9) | A (6.6) | A (2.1) |
| Comparative Example 1 | 5 | A | A | B (88.4) | B (10.8) | B (2.7) |
| Comparative Example 2 | 50 | A | C | B (89.9) | A (5.5) | A (2.0) |

TABLE 5-1

|  | Content of spherical particle (A) (% by mass) | Evaluation results | | | | |
| --- | --- | --- | --- | --- | --- | --- |
|  |  | Surface appearance | Workability | Degree of whiteness (Y value) | 60-Degree gloss value | 20-Degree gloss value |
| Example 23 | 11 | A | A | B (89.9) | A (6.3) | A (2.1) |
| Example 24 | 5.5 | A | A | B (88.8) | A (7.2) | A (2.2) |
| Example 25 | 16.5 | A | A | B (90.0) | A (5.8) | A (2.0) |
| Comparative Example 3 | 2.2 | A | A | B (89.3) | B (8.9) | B (2.5) |
| Comparative Example 4 | 22 | A | C | B (89.9) | A (5.4) | A (2.0) |

TABLE 5-2

|  | Content of spherical particle (B) (% by mass) | Evaluation results | | | | |
| --- | --- | --- | --- | --- | --- | --- |
|  |  | Surface appearance | Workability | Degree of whiteness (Y value) | 60-Degree gloss value | 20-Degree gloss value |
| Example 23 | 5.5 | A | A | B (89.9) | A (6.3) | A (2.1) |
| Example 26 | 11 | A | A | B (89.9) | A (5.2) | A (1.9) |
| Example 27 | 16.5 | A | A | B (89.2) | A (4.6) | A (1.8) |
| Comparative Example 5 | 2.2 | A | A | B (89.3) | B (9.4) | B (2.5) |
| Comparative Example 6 | 22 | A | D | B (90.0) | A (4.3) | A (1.7) |

TABLE 6-1

|  | Content of white pigment (% by mass) | Evaluation results | | | | |
| --- | --- | --- | --- | --- | --- | --- |
|  |  | Surface appearance | Workability | Degree of whiteness (Y value) | 60-Degree gloss value | 20-Degree gloss value |
| Example 1 | 11 | A | A | B (89.6) | A (5.5) | A (2.0) |
| Example 28 | 2.2 | A | A | B (88.7) | A (4.2) | A (1.7) |
| Example 29 | 4.4 | A | A | B (89.2) | A (4.6) | A (1.8) |
| Example 30 | 6.6 | A | A | B (89.5) | A (4.9) | A (1.9) |
| Example 31 | 8.8 | A | A | B (89.6) | A (5.1) | A (1.9) |
| Example 32 | 13.2 | A | A | B (89.8) | A (5.7) | A (2.0) |
| Comparative Example 7 | 0 | A | A | C (86.8) | A (3.9) | A (1.7) |
| Comparative Example 8 | 15.4 | A | B | B (90.0) | B (7.6) | B (2.3) |
| Comparative Example 9 | 17.6 | A | C | B (90.0) | B (8.1) | B (2.3) |

TABLE 6-2

|  | Content of white pigment (% by mass) | Evaluation results | | | | |
| --- | --- | --- | --- | --- | --- | --- |
|  |  | Surface appearance | Workability | Degree of whiteness (Y value) | 60-Degree gloss value | 20-Degree gloss value |
| Example 17 | 11 | A | A | B (89.9) | A (6.3) | A (2.1) |
| Example 33 | 2.2 | A | A | B (88.5) | A (4.2) | A (1.7) |
| Example 34 | 4.4 | A | A | B (88.6) | A (4.6) | A (1.8) |
| Example 35 | 6.6 | A | A | B (88.7) | A (4.9) | A (1.9) |
| Example 36 | 8.8 | A | A | B (88.8) | A (5.1) | A (1.9) |
| Example 37 | 13.2 | A | A | B (89.8) | A (5.7) | A (2.0) |
| Comparative Example 10 | 0 | A | A | C (86.9) | A (4.4) | A (1.8) |
| Comparative Example 11 | 15.4 | A | B | B (89.9) | B (8.0) | B (2.3) |
| Comparative Example 12 | 17.6 | A | C | B (90.0) | B (8.4) | B (2.4) |

INDUSTRIAL APPLICABILITY

The light diffusion reflecting plate of the present invention has a high degree of whiteness and excellent light diffusion properties and antiglare properties. In consequence, for example, in the case of disposing the light diffusion reflecting plate of the present invention in an inner wall, a ceiling, or the like, it is possible to effectively reflect natural light or illumination light and diffuse the indirect light every nook and corner of the space of the room, thereby increasing the illuminance.

REFERENCE SIGNS LIST

1 Light Diffusion Reflecting Plate
2 Substrate
3 Ground Coat Layer
4 Top Coat Layer
5 Spherical Particles
6 Spherical Particles
7 White Pigment
8 Primer Layer

The invention claimed is:

1. A light diffusion reflecting plate comprising a substrate having thereon at least a ground coat layer and a top coat layer in contact with this ground coat layer, wherein the ground coat layer is a white coating film layer; the top coat layer contains a white pigment and two kinds of spherical particles; a content of the white pigment in the top coat layer is from 2 to 15% by mass; the two kinds of spherical particles are (A) a spherical particle having an average particle size of from 5 to 30 μm and (B) a spherical particle having an average particle size of from 15 to 45 μm; a difference in the average particle size between the spherical particle (A) and the spherical particle (B) is 10 μm or more; and each of the spherical particle (A) and the spherical particle (B) is contained in an amount of from 5 to 17% by mass in the top coat layer,
wherein the light diffusion reflecting plate has a 60-Degree specular gloss value of 7.4 or less.

2. The light diffusion reflecting plate according to claim 1, wherein a thickness of the ground coat layer is from 15 to 45 μm.

3. The light diffusion reflecting plate according to claim 2, wherein the thickness of the ground coat layer is more than 30 μm and less than 45 μm.

4. The light diffusion reflecting plate according to claim 1, wherein the spherical particles are a resin bead.

5. The light diffusion reflecting plate according to claim 1, wherein a thickness of the top coat layer is from 15 to 30 μm.

6. The light diffusion reflecting plate according to claim 1, wherein the substrate is a metal sheet.

7. The light diffusion reflecting plate according to claim 1, wherein a primer layer is further provided between the substrate and the ground coat layer.

8. The light diffusion reflecting plate according to claim 1, wherein the ground coat layer comprises white pigment in an amount in the range of from 30 to 60% by mass relative to the whole amount of solids of the ground coat layer.

9. The light diffusion reflecting plate according to claim 1, wherein the ground coat layer comprises white pigment in an amount in the range of from 45 to 55% by mass relative to the whole amount of solids of the ground coat layer.

10. The light diffusion reflecting plate according to claim 1, wherein the light diffusion reflecting plate has a 20-Degree specular gloss value of 2.2 or less.

* * * * *